United States Patent
Kamiya (10) Patent No.: US 9,000,728 B2
(45) Date of Patent: Apr. 7, 2015

(54) VEHICULAR ELECTRIC CHARGE CONTROL APPARATUS AND EMERGENCY NOTIFICATION SYSTEM

(75) Inventor: Shinji Kamiya, Kariya (JP)

(73) Assignee: Denso Corporation, Kariya (JP)

( * ) Notice: Subject to any disclaimer, the term of this patent is extended or adjusted under 35 U.S.C. 154(b) by 941 days.

(21) Appl. No.: 13/135,244

(22) Filed: Jun. 29, 2011

(65) Prior Publication Data

US 2012/0001746 A1 Jan. 5, 2012

(30) Foreign Application Priority Data

Jul. 1, 2010 (JP) ................................ 2010-151293

(51) Int. Cl.
*H02J 7/00* (2006.01)
*H02J 7/04* (2006.01)

(52) U.S. Cl.
CPC .. *H02J 7/047* (2013.01); *H02J 7/04* (2013.01)

(58) Field of Classification Search
CPC ..... H02J 7/0073; H02J 7/0078; H02J 7/0093; G01R 31/3648; Y02E 60/12
USPC ........................................................ 320/132
See application file for complete search history.

(56) References Cited

U.S. PATENT DOCUMENTS

| | | | | |
|---|---|---|---|---|
| 5,440,221 | A * | 8/1995 | Landau et al. | 320/155 |
| 7,525,290 | B2 * | 4/2009 | Miyata | 320/160 |
| 7,633,265 | B2 * | 12/2009 | Matsushima et al. | 320/134 |
| 7,680,479 | B2 * | 3/2010 | Nishida | 455/343.6 |
| 2004/0100227 | A1 * | 5/2004 | Yumoto et al. | 320/151 |
| 2007/0024246 | A1 * | 2/2007 | Flaugher | 320/150 |
| 2008/0036421 | A1 * | 2/2008 | Seo et al. | 320/132 |
| 2009/0288896 | A1 * | 11/2009 | Ichikawa | 180/65.265 |
| 2010/0213901 | A1 * | 8/2010 | Morimoto et al. | 320/145 |

FOREIGN PATENT DOCUMENTS

| | | |
|---|---|---|
| JP | 11-055872 | 2/1999 |
| JP | B2-3070842 | 5/2000 |
| JP | 2001-101549 | 4/2001 |
| JP | 2002-325373 | 11/2002 |
| JP | 2002-345165 | 11/2002 |
| JP | 2004-146075 | 5/2004 |
| JP | 2007-115197 | 5/2007 |
| JP | B2-4304923 | 5/2009 |
| JP | B2-4346881 | 7/2009 |

OTHER PUBLICATIONS

Office Action dated Aug. 21, 2012 issued in corresponding Japanese Application No. 2010-151293 with English translation.

* cited by examiner

*Primary Examiner* — Arun Williams
(74) *Attorney, Agent, or Firm* — Harness, Dickey & Pierce, PLC (57) ABSTRACT

A charge control apparatus includes a main control unit and a power source control unit. The main control unit acquires time-divided temperature information, which corresponds to a predetermined period covering the present time, based on present time information and the time-divided temperature information indicating a location temperature of a backup battery in each predetermined period. The main control unit determines a charge/discharge amount of the backup battery based on the time-divided temperature information and a residual charge amount of the backup battery. The power source control unit controls the backup battery by charging and discharging in accordance with the determined charge/discharge amount.

17 Claims, 3 Drawing Sheets

VEHICULAR ELECTRIC CHARGE CONTROL APPARATUS AND EMERGENCY NOTIFICATION SYSTEM

CROSS REFERENCE TO RELATED APPLICATION

This application is based on and incorporates herein by reference Japanese patent application No. 2010-151293 filed on Jul. 1, 2010.

FIELD OF THE INVENTION

The present invention relates to a vehicular electric charge control apparatus and an emergency notification system.

BACKGROUND OF THE INVENTION

It is conventional to provide a backup battery as an auxiliary battery in addition to a main battery as a power source, which supplies electric power to various devices. For example, a patent document (JP 3070842) discloses a vehicular emergency notification system terminal device, which receives electric power supply from a backup battery in place of a main battery in case that the main battery cannot supply electric power.

A vehicular backup battery, which supplies electric power of about 1,000 mAh, is required to be operable under a temperature condition of, for example, between about −30° C. to about +85° C. and have long operating life. A lithium primary battery is operable under a lower temperature condition, because it uses organic solvent, which has a lower melting point than that of water. Further, it has less self-discharge and long operating life. For this reasons, a lithium primary battery is mostly used as a backup battery for a vehicle. The lithium primary battery used as a backup battery, however, need be exchanged each time its operating life ends, because its operating life is not so long as an operating life of a vehicle.

Another patent document (JP 4346881) discloses a DC electric power apparatus for communication, which is provided for example at a base station for radio communication and includes a nickel hydride secondary battery as a backup battery for electric power failure time.

However, the following drawback arises when the lithium primary battery is used as a backup battery for in-vehicle devices mounted in a vehicle. First, a location of mounting the lithium primary battery is limited, because there are not many locations available for easy battery exchange in a vehicle in case that it is mounted in a vehicle as a backup battery. Second, a relatively large-sized battery is needed and hence its cost necessarily becomes high. Specifically, it is necessary to monitor self-discharging condition of the backup battery and periodically monitor a discharge voltage characteristic under a rated load operation, which consumes certain current consumption for detecting failure. The backup battery accordingly needs to have an initial electric capacity, which allows current consumption for monitoring operations. Thus, the backup battery need be relatively large-sized.

It is proposed to use a secondary battery as a backup battery for in-vehicle devices mounted in a vehicle for countering the foregoing drawbacks. Since a battery internal resistance increases under low temperatures, a secondary battery is used and maintained at a fully-charged condition as much as possible so that sufficient electric capacity is ensured. However, if the secondary battery, which is fully-charged, is used under high temperature conditions, the battery internal condition tends to deteriorate earlier than in a case of half-charged. For this reason, it is difficult to ensure as many durable years or operating life (for example, about 12 years) as that of a vehicle.

SUMMARY OF THE INVENTION

It is conventional to provide a backup battery as an auxiliary battery in addition to a main battery as a power source, which supplies electric power to various devices. For example, the following patent document 1 discloses a vehicular emergency notification system terminal device, which receives electric power supply from a backup battery in place of a main battery in case that the main battery cannot supply electric power.

A vehicular backup battery, which supplies electric power of about 1,000 mAh, is required to be operable under a temperature condition of, for example, between about −30° C. to about +85° C. and have long operating life. A lithium primary battery is operable under a lower temperature condition, because it uses organic solvent, which has a lower melting point than that of water. Further, it has less self-discharge and long operating life. For this reasons, a lithium primary battery is mostly used as a backup battery for a vehicle. The lithium primary battery used as a backup battery, however, need be exchanged each time its operating life ends, because its operating life is not so long as an operating life of a vehicle.

The following patent document 2 discloses a DC electric power apparatus for communication, which is provided for example at a base station for radio communication and includes a nickel hydride secondary battery as a backup battery for electric power failure time.

Patent document 1: JP 3070842
Patent document 2: JP 4346881

However, the following drawback arises when the lithium primary battery is used as a backup battery for in-vehicle devices mounted in a vehicle. First, a location of mounting the lithium primary battery is limited, because there are not many locations available for easy battery exchange in a vehicle in case that it is mounted in a vehicle as a backup battery. Second, a relatively large-sized battery is needed and hence its cost necessarily becomes high. Specifically, it is necessary to monitor self-discharging condition of the backup battery and periodically monitor a discharge voltage characteristic under a rated load operation, which consumes certain current consumption for detecting failure. The backup battery accordingly needs to have an initial electric capacity, which allows current consumption for monitoring operations. Thus, the backup battery need be relatively large-sized.

It is proposed to use a secondary battery as a backup battery for in-vehicle devices mounted in a vehicle for countering the foregoing drawbacks. Since a battery internal resistance increases under low temperatures, a secondary battery is used and maintained at a fully-charged condition as much as possible so that sufficient electric capacity is ensured. However, if the secondary battery, which is fully-charged, is used under high temperature conditions, the battery internal condition tends to deteriorate earlier than in a case of half-charged. For this reason, it is difficult to ensure as many durable years or operating life (for example, about 12 years) as that of a vehicle.

SUMMARY OF THE INVENTION

It is an object of the present invention to provide a vehicular electric charge control apparatus and an emergency notification system, which enables to maintain a longer life of a backup battery, which is formed of a secondary battery for in-vehicle devices, while ensuring power capacity of the backup battery required in accordance with temperature conditions.

According to one aspect of the present invention, an electric charge control apparatus for a vehicle has a backup battery, which is a secondary battery for supplying electric power to in-vehicle devices mounted in the vehicle in case of emergency. The electric charge control apparatus comprises a residual charge amount monitor unit, a time information acquisition unit, a time-divided temperature information storage unit, a charge/discharge amount determination unit and a residual charge amount control unit.

The residual charge amount monitor unit monitors a residual charge amount of the backup battery. The time information acquisition unit acquires present time information indicating a present time. The time-divided temperature information storage unit stores time-divided temperature information, which indicates a temperature in each predetermined period at a battery location of the backup battery. The charge/discharge amount determination unit determines a charge/discharge amount of the backup battery based on the time-divided temperature information and the residual charge amount. The time-divided temperature information is acquired based on the present time information and the time-divided temperature information. The residual charge amount control unit controls the residual charge amount of the backup battery by charging and discharging the backup battery in accordance with the charge/discharge amount determined by the charge/discharge amount determination unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

The present invention will be described below with respect to an embodiment with reference to the drawings.

Figure 1:
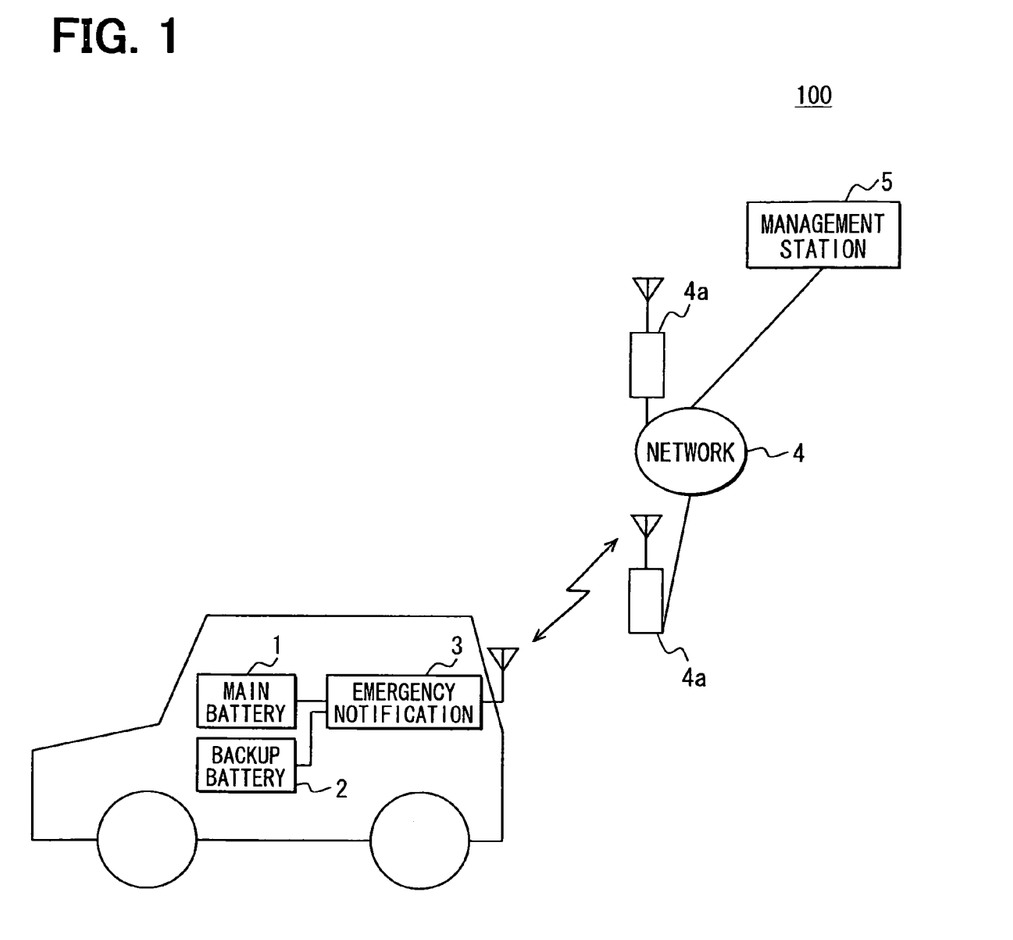
FIG. 1 is a block diagram showing a general configuration of an emergency notification system according to an embodiment of the present invention.

Referring first to FIG. 1, an emergency notification system 100 is formed of an emergency notification apparatus 3, a communication network 4, base stations 4a and a management station 5. The emergency notification apparatus 3 are operable with electric power supplied from a main battery 1 and/or a backup battery 2. The main battery 1, the backup battery 2 and the emergency notification apparatus 3 are mounted in a vehicle. The vehicle, in which the main battery 1, the backup battery 2 and the emergency notification apparatus 3 are mounted, is referred to as a subject vehicle.

The main battery 1 is a main power source for supplying electric power to each electric load in the vehicle. It is usable as a power source for supplying electric power to a starter in case of starting an engine. The main battery 1 is also the main power source for the emergency notification apparatus 3. The main battery 1 may be formed of a lead storage battery, for example. The main battery 1 is operatively connected to supply its electric power to various in-vehicle devices mounted in the subject vehicle, when an accessory (ACC) switch is turned on, that is, an ACC power source of the subject vehicle is in the on-state.

The backup battery 2 is provided as an alternative power source of the main battery 1 to supply electric power to at least a part of the in-vehicle devices, which includes the emergency notification apparatus 3, in such cases as the power supply from the main battery 1 is disabled because of breakage of the battery 1 or a power supply line from the main battery 1 due to traffic accidents, the power supply from the main battery 1 is interrupted because of exchange of the main battery 1, or the power supply from the main battery 1 is interrupted because of breakage of a protective fuse, which is provided between the main battery 1 and the emergency notification apparatus 3. The backup battery 2 is formed of a plurality of battery cells.

The backup battery 2 is assumed to be a secondary battery, which is operable under temperature conditions between about −30° C. and about +85° C. The backup battery 2 is preferably either a lithium-ion secondary battery or a lithium-ion polymer secondary battery. The lithium-ion secondary battery and the lithium-ion polymer secondary battery are used for the reasons that they use organic solvent having lower melting point than water and are operable under low temperatures, and that they have self-discharge characteristics superior than other secondary batteries such as a nickel-cadmium battery or a nickel-hydride battery and longer life, and that they are compact-sized and less limited to be mounted in the vehicle. It is however possible to use as the backup battery 2 a nickel-hydride secondary battery or the like, which is other than the lithium-ion secondary battery and the lithium-ion polymer secondary battery.

Although the backup battery 2 is assumed to be operable under the temperature condition between about −30° C. and about +85° C. according to the present embodiment, the backup battery 2 need not be so necessarily. For example, it may be operable under other temperature conditions such as under a temperature condition between about −20° C. and about +65° C.

The emergency notification apparatus 3 is an in-vehicle device, which is mounted in a vehicle and configured to make an emergency notification to the management station 5 as an information addressee in case of occurrences of emergency such as accident, sudden illness and theft. The emergency notification from the emergency notification apparatus 3 to the management station 5 includes data communication about present position information, vehicle registration information, accident information, failure information and theft information of the subject vehicle. It also includes inquiries by voice communication from a passenger in the subject vehicle. The emergency notification apparatus 3 is further configured to respond to commands or the like, which the management station 5 transmits in connection with the emergency notification. The emergency notification apparatus 3 will be described in more detail below.

The communication network 4 is a network, which performs mutual communications between the emergency notification apparatus 3 and the management station 5. As the communication network 4, a conventional cell phone network or the Internet network may be used. Each base station 4a is a facility capable of direct communication with the emergency notification apparatus 3. One or more base stations are connected to the communication network 4. The base station 4a is a fixed facility, which is provided on an electric pole, a top of a building, a phone booth, a ceiling above a subway platform, for example.

The management station 5 is formed of a server, which is configured to receive the emergency notification from the emergency notification apparatus 3 through the base station 4a and the communication network 4, and respond to the emergency notification apparatus 3 through the communication network 4 and the base station 4a in response to the emergency notification. The response from the management station 5 to the emergency notification apparatus 3 includes data communication of voice information, image information and the like about a command corresponding to an emergency condition as well as commands from an operator by voice communication. The management station 5 is assumed to be an operation management station in a conventional emergency notification service, which is one of telematics services, for example.

The management station 5 is configured as an operation management station for the emergency notification service, as an example. For example, the management station 5 may be managed by a police station, a fire department, a hospital or a security company.

Figure 2:
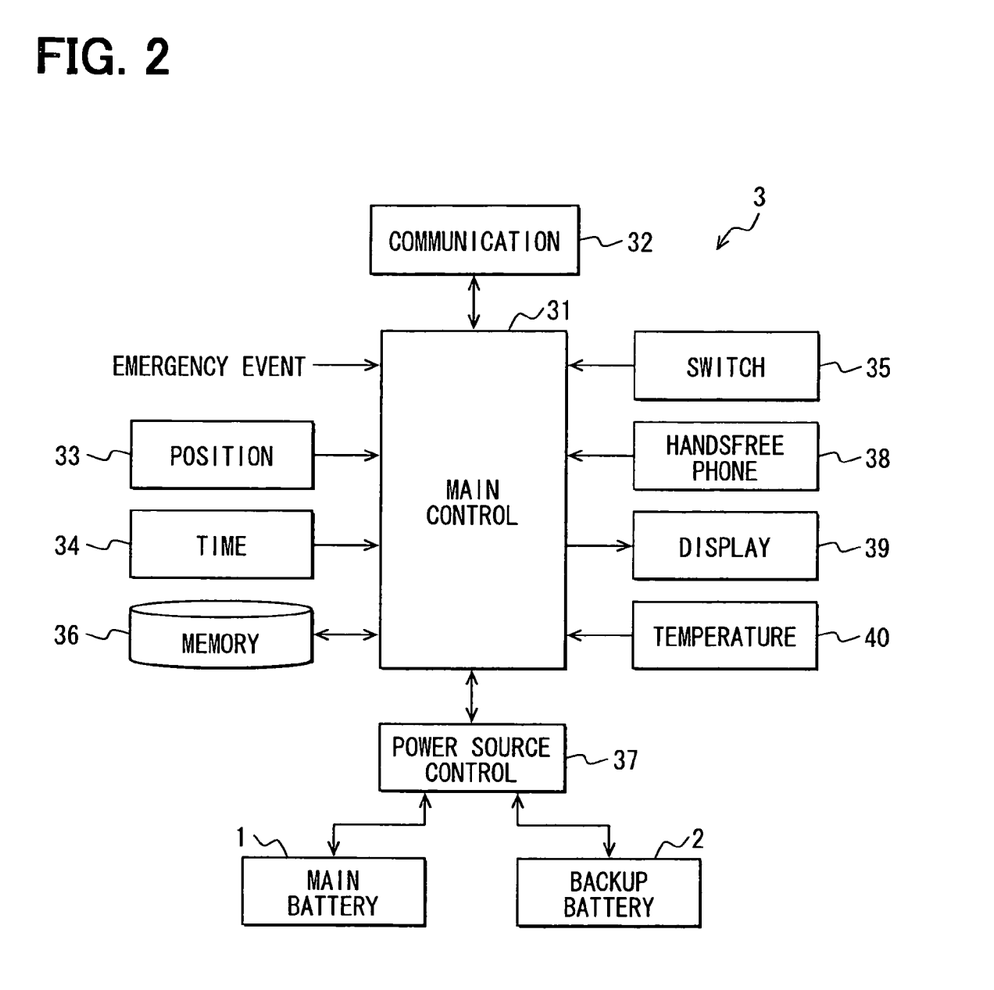
FIG. 2 is a block diagram showing a generation configuration of an emergency notification apparatus used in the embodiment.

The emergency notification apparatus 3 is configured in detail as shown in FIG. 2. As shown in FIG. 2, the emergency notification apparatus 3 is formed of a main control unit 31, a management station communication unit 32, a position detection unit 33, a time information acquisition unit 34, an operation switch unit 35, a memory unit 36, a power source control unit 37, a handsfree phone unit 38, a display unit 39 and a temperature monitor unit 40. The main control unit 31, the power source control unit 37 and the temperature monitor unit 40 operate as a vehicular electric charge control device.

The communication unit 32 has a function of data transmission/reception between the emergency notification apparatus 3 and the management station 5 and a function of voice communication. Based on the data transmission/reception function and the voice communication function, transmission of the emergency notification to the management station 5 through the base station 4a and the communication network 4 is enabled and reception of the response from the management station 5 through the communication network 4 and the base station 4a is enabled.

The position detection unit 33 is provided to detect a present position of the subject vehicle. The position detection unit 33 may be configured to detect the present position of the subject vehicle by using, for example, GPS (global positioning system). It may be configured to detect the present position of the subject vehicle by using measurement values of a direction sensor such as a gyroscope (not shown) and measured values of an acceleration sensor and wheel speed sensors. It is also possible to use a position detector of a vehicle navigation system as the position detection unit 33.

The time information acquisition unit 34 is provided to acquire information about present time. For example, the time information acquisition unit 34 may be configured to acquire present time information through an in-vehicle LAN from a time measuring device such as a clock mounted in the subject vehicle. In case a GPS is used as described above, time information acquired from the GPS satellite may be used. It is also possible to use time information supplied from the base station 4a. As a further alternative, it may be connected to the network 4 so that the time information is acquired from the server connected to the network 4. In addition, the time information may be acquired by measuring sunset time and sunrise time by a solar sensor (not shown).

The operation switch unit 35 uses, for example, mechanical switches so that operation commands for various functions may be issued by switch operations. The operation switch unit 35 may include an emergency notification switch, which the passenger is allowed to operate at the time of occurrence of an emergency condition such as an accident, sudden illness and burglary. The memory unit 36 may be configured to store therein information, which is necessary for communication with the management station 5 and include vehicle registration information, time-divided temperature information, year-divided reference amount information. The memory unit 36 thus operates as a time-divided temperature information unit.

The time-divided temperature information indicates temperature at each predetermined time interval at a location in the subject vehicle, where the backup battery 2 is mounted. This location is referred to as a battery location. It is information, for example, provided in a data table, in which a time period and a temperature are coordinated as a pair. The predetermined time interval is a period, which may be arbitrarily set and determined to be, for example, a period of one month or a period of one season in a year. The period of season may be determined differently based on a socially-accepted custom, astronomy, climatology and the like.

As one example, spring may be determined to cover a period from the spring equinox to the summer solstice, summer may be determined to cover a period from the summer solstice to the autumn equinox, autumn may be determined to cover a period from the autumn equinox to the winter solstice, and winter may be determined to cover a period from the winter solstice to the spring equinox. As another example, spring may be determined to cover a period from the first day of spring to the first day of summer including the spring equinox as a center of the spring period, summer may be determined to cover a period from the first day of summer to the first day of autumn including the summer solstice as a center of the summer period, autumn may be determined to cover a period from the first day of autumn to the first day of winter including the autumn equinox as a center of the autumn period, and winter may be determined to cover a period from the first day of winter to the first day of spring including the winter solstice as a center of the winter period. It is also possible to determine that spring covers March to May, summer covers June to August, autumn covers September to November and winter covers December to February.

The temperature of battery location may be predetermined before shipment of a vehicle, in which the emergency notification apparatus 3 will be mounted, in accordance with destination (area of sale) of the vehicle.

It is assumed that the memory unit 36 is configured to store as the time-divided temperature information the data in a data table form (time-divided temperature table). In this table, temperatures at locations of mounting the backup battery 2 (battery location temperature) are coordinated with each month (January to December) of one year as a pair. The battery location temperature coordinated with each month in the time-divided temperature table stored in the memory unit 36 may be set as a default in correspondence to the average temperature of each month in the area of sales of a vehicle mounted with the emergency notification apparatus 3.

The year-divided reference amount information indicates a reference amount for each year elapsing after manufacture of the backup battery 2, as will be described later. The year-divided reference amount information is, for example, information about a reference amount coordinated with elapsed year in a data table form (year-divided reference amount table). The life of durability of a vehicle is assumed generally to be 12 years, for example, and the maximum elapsed year is limited to 12 years in the year-divided reference amount table. That is, twelve reference amounts are set for the first year to the twelfth year in the year-divided reference amount table.

The value of the reference amount for each year will be described later. Although the life of a vehicle is assumed to be 12 years, it may be set to other number of years.

The power source control unit 37 is provided to control the main battery 1 and the backup battery 2. Specifically, the power source control unit 37 has a function of switching over the two batteries 1 and 2 and a function of monitoring a residual charge amount of each battery. The power source control unit 37 operates as a residual charge monitor unit. The residual battery charge amount may be monitored as a battery capacity by monitoring a SOC (state of charge) of each battery, for example. The power source control unit 37 is configured to have a function of monitoring voltages of the main battery 1 and the backup battery 2 as well. The power source control unit 37 is further configured to have a function of managing the residual charge amount of the backup battery 2 in correspondence to time, when commanded by the main control unit 31. The power source control unit 37 operates as a residual charge amount control unit. Control of the residual charge amount of the backup battery 2 in correspondence to time will be described later.

The handsfree phone unit 38 is provided to perform handsfree voice communication between the management station 5 (specifically an operator at the management station 5) and a passenger in the subject vehicle by using a microphone and a speaker of a handsfree phone set (not shown). More specifically, the microphone receives inquiries of the passenger by voice communication, and the speaker outputs a command or the like as the response from the management station 5. This command is in correspondence to the emergency condition and outputted as voice sound based on voice sound information from the management station 5 or the voice communication from the operator in the management station.

The display unit 39 is provided to perform indicator display, which provides a variety of information by lighting or flashing a light such as an LED, for example. The display unit 39 may be configured to perform monitor display, which provides a variety of information by displaying texts or images on a liquid crystal display, an organic EL display or a plasma display, for example. However, the display unit 39 is assumed to perform the indicator display by lighting or flashing the LED. The LED of the display unit 39 may be provided for each item of information, which is to be provided.

The temperature monitor unit 40 is provided to monitor a temperature of the location of the backup battery 2 (that is, the battery location temperature). For example, the temperature monitor unit 40 may be configured to monitor the battery location temperature by acquiring measurement results of a temperature sensor, which is capable of measuring temperatures in a temperature range between about −30° C. and about +85° C.

The main control unit 31 may be formed of a conventional computer, which includes therein a CPU, a memory such as ROM and EEPROM, an I/O and bus lines connecting those components (none shown). The main control unit 31 is configured to perform a variety of processing by executing a variety control programs stored in the ROM by using a variety of information inputted from the communication unit 32, the position detection unit 33, the time information acquisition unit 34, the operation switch unit 35, the memory unit 36, the power source control unit 37, the handsfree phone unit 38 and the temperature monitor unit 40.

For example, the main control unit 31 turns on an emergency notification flag provided therein and starts emergency notification processing, when an emergency event signal is inputted from an external device (not shown). The main control unit 31 performs the emergency notification processing by causing data transmission from the communication unit 32 to the management station 5. The data may include the subject vehicle position information acquired from the position detection unit 33 and the vehicle registration information retrieved from the memory unit 36. The data may also include voice sound data of inquiry of a passenger made by voice communication through the handsfree phone unit 38.

The emergency event signal is a signal, which triggers the emergency notification apparatus 3 to start the emergency notification processing and inputted to the main control unit 31. The emergency event signal is, for example, an operation signal generated externally when the emergency notification switch is operated, a collision detection signal generated when a collision detection sensor detects collision or an activation signal (for example, activation signal of an airbag ECU) indicating activation of a collision safety apparatus. The emergency event signal is event information.

The management station 5 may be configured to dispatch a rescue team to a location of the notified emergency condition or provides an operator's response action in response to an inquiry or report of the passenger by the voice communication based on information, which indicates a location of occurrence of the emergency condition specified by the position information of the vehicle and indicates the subject vehicle specified by the vehicle registration information.

In case that the subject vehicle has an imaging device, which images a surrounding area and a compartment area of the subject vehicle, the main control unit 31 may acquire images of the surrounding area and the compartment area imaged by the imaging device and transmit the emergency notification including such acquired image information to the management station 5. The management station 5 may be configured such that, when the image information is received, the image is displayed visually based on the received image information thereby to enable the operator in the management station 5 to grasp a detailed condition about the location of occurrence of emergency.

The main control unit 31 is configured to output a power source switching signal to the power source control unit 37 when a predetermined condition is satisfied. This power source switching signal is for instructing a switch-over of the power source of the emergency notification apparatus 3 from the main battery 1 to the backup battery 2 or from the backup battery 2 to the main battery 1.

Specifically, the main control unit 31 checks whether the voltage of the main battery 1, which is monitored by the power source control unit 37, is less than a predetermined threshold voltage, upon detection of the turn-on of the ACC power source. The predetermined threshold voltage is set to an arbitrary value, above which stabilized electric power can be supplied from the main battery 1. If the voltage of the main battery 1 is not less than the threshold voltage, the main control unit 31 outputs to the power source control unit 37 a signal, which instructs use of the main battery 1 as the power source of the emergency notification apparatus 3. At this time the power supply line for supplying electric power from the backup battery 2 to the emergency notification apparatus 3 remains interrupted.

If the voltage of the main battery 1 is less than the threshold voltage, the main control unit 31 checks whether the backup battery 2 is connected by monitoring the voltage of the backup battery 2 by the power source control unit 37. If it is determined that the backup battery 2 is connected, the main control unit 31 outputs to the power source control unit 37 the power source switching signal (emergency mode switching signal), which commands the switch-over of the power source for the emergency notification apparatus 3 from the main battery 1 to the backup battery 2. The power source control unit 37 connects the power supply line, which supplies electric power from the backup battery 2 to the emergency notification apparatus 3, to switch over the power source from the main battery 1 to the backup battery 2 in response to the emergency mode switching signal.

It is possible to inhibit the power source switch-over to the backup battery 2 until a predetermined time elapses after the ACC power source is switched to the off-state from the on-state so that the electric power of the backup battery 2 is prohibited from being consumed when the voltage of the main battery 1 temporarily falls at the time of engine starting and responsively the power source is switched to the backup battery 2.

After outputting the emergency mode switching signal, the main control unit 31 checks whether the emergency notification operation is being performed (that is, the emergency notification processing has already started) by referring to the emergency notification flag. If the emergency notification flag is in the on-state, which indicates that the emergency notification operation is being performed, the main control unit 31 outputs to the communication unit 32 a signal, which instructs continued use of the backup battery 2 as the power source for the emergency notification apparatus 3. As a result, the backup battery 2 is continuously used as the power source of the emergency notification apparatus 3.

If the emergency notification flag is in the off-state, the main control unit 31 determines that the emergency notification processing has not yet started and monitors input of the emergency event signal. If no emergency event signal is detected after the predetermined time from outputting the emergency mode switching signal, the main control unit 31 outputs to the power source control unit 37 a power source switch-over signal (normal mode switch-over signal), which instructs the switch-over of the power source for the emergency notification apparatus 3 from the backup battery 2 to the main battery 1. The power source control unit 37 interrupts the power source line, which supplies electric power from the backup battery 2 to the emergency notification apparatus 3, to switch over the power source from the backup battery 2 to the main battery 1 in response to the normal mode switch-over signal.

The main control unit 31 may be configured to cause the display unit 39 to light or flash its LED at the time of outputting the emergency mode switching signal so that the passenger is notified of the switch-over of the power source from the main battery 1 to the backup battery 2.

The main control unit 31 performs a self-check about the backup battery 2 based on the voltage and the residual charge amount of the backup battery 2 monitored by the power source control unit 37 while, for example, the engine of the subject vehicle is not operated. When the main control unit 31 detects by its self-check operation that the voltage or the residual charge amount of the backup battery 2 is abnormal (for example, the voltage or the residual charge amount is less than an allowable level), the main control unit 31 may light or flash the LED of the display unit 39 thereby to notify the passenger of abnormality in the backup battery 2.

The main control unit 31 further counts and determines years of use, that is, years of elapse, of the backup battery 2 after the battery manufacture. The main control unit 31 operates as a year elapse or use determination unit. The main control unit 31 may be so configured to determine the year of use from manufacture of the backup battery 2 by storing information about the year of manufacture of the backup battery 2 (that is, registration of information about year of manufacture) in a non-volatile memory such as the ROM and calculating the year of elapse from manufacture of the backup battery 2 based on information about the present time acquired from the time information acquisition unit 34. The information about the year of manufacture may be registered, for example, at a manufacturing plant or the like when the emergency notification apparatus 3 is mounted in the subject vehicle.

The main control unit 31 is configured to perform temperature condition learning processing, which learns the battery location temperature conditions, at every predetermined period (for example, at one-month interval) based on the temperature at the battery location of the backup battery 2, which is monitored repetitively, that is, periodically, by the temperature monitor unit 40. The main control unit 31 operates as a temperature condition learning unit. In the temperature condition learning processing, the battery location temperature is acquired from the temperature monitor unit 40 throughout a year at a predetermined timing within a period that the ACC power source is in the on-state, that is, the emergency notification apparatus 3 is operated with the main battery 1. A representative value of the mounting location temperatures for each month is determined based on the battery location temperatures acquired throughout the year. This calculated value (that is, learning result) is coordinated with the corresponding month and stored in the time-divided temperature table in the memory unit 36. In storing the time-divided temperature table data provided by the temperature condition learning processing into the memory unit 36, the time-divided temperature table pre-stored as a default may be cancelled.

The predetermined timing may be a time point of detecting that the ACC power source has been turned on or every fixed time interval while the ACC power source is in the on-state. The representative value of the battery location temperature may be an average value, a mode value, an intermediate value or other similar values of the battery location temperatures in one month. According to the present embodiment, the average value of the battery location temperatures in each month is used as an example.

It is preferred that the battery location temperature condition for each period is learned in the temperature condition learning processing based on the mounting location temperatures repetitively monitored for more than two years. Since the temperature in each month or each season in a year can thus be learned based on the results of monitoring more than two times, the information about the battery location temperature for each predetermined period can be acquired accurately.

For learning the battery location temperature condition for each period based on the battery location temperatures monitored repetitively for at least two years, the main control unit 31 may use the default data of the time-divided temperature table before the third year and the time-divided temperature table data calculated by the temperature condition learning processing of two years from the third and subsequent years.

It is also possible for the main control unit 31 to use the default data of the time-divided temperature table for the first year, the time-divided temperature table data determined by the temperature condition learning processing executed in the first year for the second year and the time-divided temperature table data determined by the temperature condition learning processing executed for two years for the third and subsequent years. It is also possible for the main control unit 31 to use the time-divided temperature table data determined by the temperature condition learning processing of previous years after the third year (that is, data of three years for the fourth year and data of four years for the fifth year).

The main control unit 31 is configured to further perform the residual charge amount control-related processing, by which the power source control unit 37 controls the residual charge amount of the backup battery 2 in correspondence to time. The residual charge amount control-related processing is described in detail below with reference to FIG. 3. This processing is assumed to be started, for example, when the ACC power source of the subject vehicle is turned on and the supply of electric power from the main battery 1 to the emergency notification apparatus 3 is started.

Figure 3:
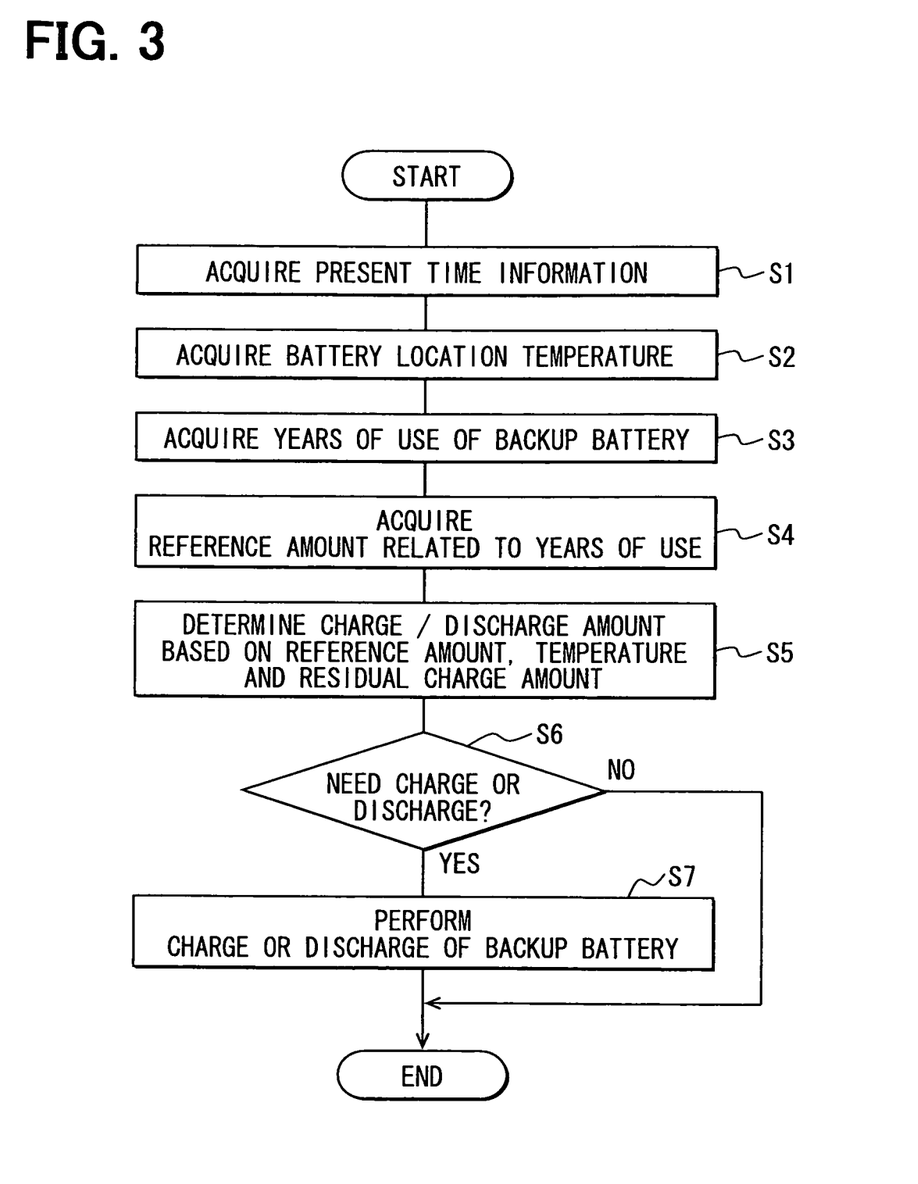
FIG. 3 is a flowchart showing processing related to residual electric charge amount control executed in the embodiment.

The main control unit 31 acquires at step S1 the present time information from the time information acquisition unit 34 and then executes step S2. The present time information includes, for example, at least information about month and day.

The main control unit 31 determines at step S2 the battery location temperature of a month (that is, period) in a range from January to December, to which the present time belongs, by referring to the time-divided temperature table of the memory unit 36 based on the present time information acquired at step S1. For example, if the present time is May 13, the main control unit 31 acquires the battery location temperature stored and coordinated to May in the time-divided temperature table. The main control unit 31 uses the default data until the time-divided temperature table is completed by the temperature condition learning processing. The main control unit 31 uses the time-divided temperature table data determined based on the above-described learning processing after the time-divided temperature table is completed by the temperature condition learning processing.

The main control unit 31 determines at step S3 the years of use of the backup battery 2 after the year of its manufacture based on the present time information acquired at step S1, and then executes step S4. The main control unit 31 determines a reference value corresponding to the years of use of the backup battery 2 after manufacture by referring to a year-divided reference value table stored in the memory unit 36 based on the years of use determined at step S3, and then executes step S5.

The reference amount indicates a value, which is used as a reference in processing of determining the residual charge amount variable with temperature as described below. The reference amount is set to initially at most one-half of the full capacity (for example, 50% of full charge amount) available at the time of manufacture of the backup battery 2 and then increase up to about full charge capacity (for example, 90% of full charge amount) with an increase of years of elapse after manufacture of the backup battery 2. The fully-charge capacity is not set to 100% of the capacity of the backup battery 2 but is set to, for example, 90% of the capacity of the backup battery 2 as described above, so that the backup battery 2 may be protected from deteriorating.

The reference amount may be set to twelve different values, which change in steps. As one example, the residual charge amount 50% (50% charge) is coordinated with the first year of elapse and increases year by year toward the residual charge amount 90% (full charge) at the twelfth year of elapse.

According to the present embodiment, steps S3 and S4 are executed following step S2. The order of execution is not limited to this order. For example, step S2 may be executed following steps S3 and S4. Steps S3 and S4 may be executed in parallel to step S2.

The main control unit 31 performs charge/discharge amount determination processing for determining a charge/discharge amount of the backup battery 2 based on the battery location temperature acquired at step S2, the reference amount determined at step S4 and the residual charge amount of the backup battery 2 monitored by the power source control unit 37, and then executes step S6. In the charge/discharge amount determination processing, the main control unit 31 determines the charge/discharge amount relative to the reference amount determined at step S4 so that the residual charge amount of the backup battery 2 approaches the full-charge amount (that is, residual charge amount 90%) as the battery location temperature acquired at step S2 falls. The main control unit 31 thus operates as a charge/discharge amount determination unit.

For example, the memory unit 36 may store twelve kinds of tables, in which the battery location temperature and the residual charge amount of the backup battery 2 are coordinated as a pair with respect to each of twelve steps of reference values. The main control unit 31 may refer to the tables based on the reference amount and the battery location temperature, and acquire the residual charge amount corresponding to the reference amount and the battery location temperature.

In this case, the table may provide the battery location temperatures in a range from −30° C. to +85° C. For +85° C., the residual charge amount may be set to the above-described reference amount. The residual charge amount may be set to approach the full charge amount, which is coordinated with −30° C., as the temperature falls. In this case, for suppressing deterioration of the backup battery 2 by suppressing the number of charging and discharging, it is preferred to coordinate the residual charge amount to each temperature range of more than a predetermined width, for example, 5° C.

In this table, the residual charge amount may be coordinated to increase linearly as the battery location temperature falls. The residual charge amount may be coordinated to increase in a curve as the battery location temperature falls. The residual charge amount may be coordinated to increase in steps as the battery location temperature falls.

It is also possible to determine the residual charge amount in correspondence to the reference amount value and the battery location temperature by using the reference amount value, the battery location temperature and a function, which is stored in the non-volatile memory such as ROM in the main control unit 31. The function is predetermined to calculate the residual charge amount, which approaches the full-charge of the backup battery 2 relative to the reference amount as the battery location temperature falls. This function may be predetermined such that the residual charge amount increases linearly or in a curve as the battery location temperature falls.

The main control unit 31 checks at step S6 whether the backup battery 2 need be charged or discharged based on the charge/discharge amount determined at step S5. For example, the main control unit 31 determines that the backup battery 2 need be charged and discharged when the absolute value of the charge/discharge amount determined at step S5 is equal to or greater than a predetermined threshold value. The predetermined threshold value is set to an arbitrary value, which indicates that an advantage of charging and discharging will exceed deterioration of the backup battery 2 caused by charging and discharging of the backup battery 2. If the main control unit 31 determines that the backup battery 2 need be charged or discharged (YES at step S6), step S7 is executed. If the main control unit 31 does not determine that the backup battery 2 need be charged or discharged (NO at step S6), this processing is terminated.

The main control unit 31 outputs at step S7 the charge/discharge amount determined at step S5 to the power source control unit 37 so that the power source control unit 37 performs charging or discharging of the backup battery 2 by the determined charge/discharge amount. By this charging and discharging operation, the power source control unit 37 controls the residual charge amount of the backup battery 2. The main control unit 31 terminates the above-described processing after step S7.

The power source control unit 37 may be configured to perform the charging and discharging of the backup battery 2 by, for example, connecting the main battery 1 and the backup battery 2 and transferring the electric power between the main battery 1 and the backup battery 2. It is also possible to configure the power source control unit 37 to perform the discharging of the backup battery 2 by, for example, connecting the backup battery 2 to a motor or resistors (not shown) of the subject vehicle and supplying a current from the backup battery 2 to the motor or the resistors.

According to the present embodiment, as described above, the residual charge amount of the battery can be controlled in accordance with the temperature indicated by the time-divided temperature information, which corresponds to the predetermined period covering the present time. By changing the residual charge amount of the backup battery 2 to approach the full-charge condition as the temperature falls, sufficient current capacity can be ensured. When the temperature rises high, the residual charge amount of the backup battery 2 is controlled to be close to the reference amount while ensuring the residual charge amount of the backup battery 2 to ensure sufficient current capacity under such a high temperature condition. Thus, the residual charge amount can be suppressed to be low relative to the full-charge condition and the deterioration of the backup battery 2 is suppressed.

As a result, the life of the backup battery 2 can be prolonged, while ensuring the current capacity of the backup battery 2, which is variably required in accordance with the temperature condition.

If the capacity of the cells is great at the time of manufacture of the batter 2, the reference amount is set to at most one-half of the full capacity provided at the time of manufacture of the backup battery 2 and the residual charge amount of the backup battery 2 is controlled at lower values than the full-charge condition. Influence of deterioration of the backup battery 2 under high temperature condition is thus reduced. By suppressing the influence of deterioration, the life of the backup battery 2 can be prolonged.

The reference amount is set to be closer to the full-charge amount as the years of use of the backup battery 2 after manufacture increase, and the residual charge amount of the backup battery 2 is controlled based on such a residual charge amount. Thus, sufficient current capacity can be ensured in preference to suppressing the influence of deterioration, even when the capacity of cells is reduced because of long use of the backup battery 2. This configuration is advantageous near the end of life of the backup battery 2, because it is remarkably less important to suppress the influence of deterioration than at the time of manufacture.

It is possible to store the time-divided temperature information in the memory unit 36 in a form most appropriate for the use condition of the subject vehicle by the temperature condition learning processing. As a result, the life of the backup battery 2 can be prolonged in a more appropriate manner for each backup battery 2 (that is, for each backup battery 2 used in different use condition) while ensuring the current capacity required in correspondence to temperature conditions.

The above-described residual charge control for the backup battery 2 may be performed uniformly among all cells of the backup battery 2. It is however preferred to perform the residual charge control for each cell, because variations in the residual charge amounts among the cells will promote deterioration of cells.

Although the time-divided temperature table (that is, time-divided temperature information) is stored in the memory unit 36 according to the present embodiment, it may be stored differently. For example, the time-divided temperature information may be stored in a non-volatile memory, which is electrically rewritable, such as the EEPROM provided in the main control unit 31.

Although the use year-divided reference amount table (that is, use year-divided reference amount information) is stored in the memory unit 36 according to the present embodiment, it may be stored differently. For example, the use year-divided reference amount information may be stored in a non-volatile memory, which is electrically rewritable, such as the EEPROM provided in the main control unit 31.

In the present embodiment, the information about the battery location of each month in a year is exemplified as the time-divided temperature information. However, other information may be exemplified as the time-divided temperature information. For example, the time-divided temperature information may be information about temperature at the battery mounting location, where a temperature changes in a certain tendency in units of time division. For example, the time division may be a day or time of day, which is other than the above-described season.

However, in case of using the battery location temperature information acquired in each unit of short time such as the time of day as the time-divided temperature information, the residual charge amount of the backup battery is managed in each unit of short time period. As a result, the number of charging and discharging will increase and the advantage of suppressing deterioration of the backup battery 2 will be lessened. Therefore, it is preferred to use the mounting location temperature information acquired in a unit of time division such as one month or one season in a year, which is longer than one day or hour-minute time of day.

According to the present embodiment, the time-divided temperature information learned in the temperature condition learning processing is stored in the memory unit 36 and the learned time-divided temperature information is used in the residual charge amount control processing. However, for example, the temperature condition learning processing may be omitted, and the time-divided temperature information stored in the memory unit 36 as the default value may be used in the processing related to the residual charge amount control.

According to the present embodiment, the charge/discharge amount determination processing is performed by acquiring the reference amount corresponding to the years of use of the backup battery 2 after its manufacture. However, for example, the reference amount may be a fixed value.

Further, in the emergency notification apparatus 3, the main control unit 31 may be configured to cause the display unit 39 or the speaker of the handsfree phone unit 38 to output the notification, which indicates that the period of continuation of the emergency notification from the emergency notification apparatus 3 is shortened, when the battery location temperature monitored by the temperature monitor unit 40 is less than the predetermined threshold value. The display unit 39 and the handsfree phone unit 38 operate as a notification unit. The predetermined threshold value is an arbitrarily set value, which is as low as, for example, 0° C. or −10° C.

For example, the display unit 39 may notify by the indicator display of lighting or flashing of the LED that the period of continued notification of the emergency from the emergency notification apparatus 3 is shortened. Further, the display unit 39 may notify by the monitor display of text or icon that the period of continued notification of the emergency from the emergency notification apparatus 3 is shortened.

The notification from the speaker of the handsfree phone unit 38 indicating that the period of continued notification of the emergency is shortened may be performed by outputting voice prompt of such a message as "a backup battery operation has been started, but a notification period is shortened because the battery temperature is low."

According to this configuration, when the battery location temperature of the batter 2 is low and the period of continued notification of the emergency from the emergency notification apparatus 3 is limited to be short, this situation is notified to the passenger of the subject vehicle. Thus the passenger of the subject vehicle can be prompted to take quick action to respond to the emergency notification.

The emergency notification apparatus 3 may be configured to output the emergency notification such that the main control unit 31 calculates the period of continuation of the emergency notification based on the residual charge amount of the backup battery 2 monitored by the power source control unit 37 and the communication unit 32 transmits the calculated period of continuation of the emergency notification to the management station 5. Thus the main control unit 31 operates as an emergency notification continuation period calculation unit.

In this instance, the continuation period of the emergency notification may be configured as follows. The main control unit 31 estimates a distance from the subject vehicle to the base station 4a based on delay time in radio wave propagation relative to the base station 4a. This distance may be estimated by using a conventional method such as the TOA method or the TDO method. In case that the position information about the subjection vehicle is necessary for the distance estimation, the position information of the subject vehicle may be detected by the position detection unit 33.

Then the main control unit 31 estimates approximate electric power consumption based on the estimated distance relative to the base station 4a and electric power required for transmission of the emergency notification. Based on the estimated power consumption and the residual charge amount of the battery monitored by the power source control unit 37, the period of continuation of the emergency notification from the emergency notification apparatus 3 is determined repetitively. The emergency notification continuation period calculated repetitively may be transmitted to the management station 5 repetitively.

Since the emergency notification continuation period is notified to the management station 5, it becomes possible to urge the management station 5 side to take quick actions in response to the emergency notification. For example, by urging the operator at the management station 5 to take quick action, it becomes possible to release the driver from uneasiness that the emergency notification may be terminated before being completed because of battery exhaustion. However, since the future continuation period of emergency notification is repetitively notified to the management station 5, the operator at the management station 5 is enabled to take appropriate actions from the management station 5 side in accordance with each emergency notification continuation period. It becomes possible to release the passenger from uneasiness about the possibility of interruption of the emergency notification before completion because of running down of the backup battery 2.

The calculation of the emergency notification continuation period is not limited to the above-described method but may be performed in other methods. For example, the calculation may be performed as follows. It is assumed in this case that the power consumption of the backup battery 2 is coordinated with each mounting location temperature and stored in the memory unit 36 in a table form.

The main control unit 31 first refers to the table stored in the memory unit 36 based on the battery location temperature monitored repetitively by the temperature monitor unit 40 and acquires the power consumption corresponding to the battery location temperature. The main control unit 31 then calculates repetitively the continuation period of the emergency notification from the emergency notification apparatus 3 based on the power consumption acquired based on the battery location temperature and the residual charge amount of the backup battery 2 monitored by the power source control unit 37. Since the emergency notification continuation period is thus calculated and notified to the management station 5, it is possible to urge the management station 5 side to take quick action regarding the emergency notification.

According to the present embodiment, the residual charge amount is determined by acquiring the reference amount, which corresponds to the years of use of the backup battery 2 from its manufacture. However, the residual charge amount may be determined by acquiring a reference amount, which corresponds to an index indicating a degree of deterioration of the backup battery 2. This index is other than the years of use of the backup battery 2 after manufacture. As one example, the residual charge amount may be determined by acquiring a reference value corresponding to an integrated value of mounting location temperatures monitored by the temperature monitor unit 40 after manufacture of the backup battery 2, in place of the reference value of the years of use of the backup battery 2 after manufacture of the backup battery 2.

In this case, information of the reference values (integrated value-divided reference amount information) corresponding to respective integrated values of the battery location temperatures monitored by the temperature monitor unit 40 after manufacture of the backup battery 2 may be stored in place of the use year-divided reference amount information. The integrated value-divided reference amount information is information, which is provided in a table form by coordinating the integrated value of temperatures and the reference amount, and a plurality of steps of reference values are set in correspondence to the integrated values of temperatures.

In this case, the main control unit 31 may be configured to calculate the integrated value by integrating the battery location temperature, which is monitored by the temperature monitor unit 40 in a unit period of time of one day or one day. The main control unit 31 thus operates as an accumulated environmental temperature control unit. It is assumed that the reference amount is set to initially at most one-half (for example, 50%) of the full charge capacity of manufacture of the backup battery 2 and then increase up to about full charge capacity (for example, 90%) with an increase of the integrated value of the battery location temperatures monitored by the temperature monitor unit 40 after manufacture of the backup battery 2. This reference value is coordinated with the integrated value in the integrated value-divided reference amount table. That is, the main control unit 31 sets the reference amount to be closer to the full-charge capacity as the calculated integration value increases, while setting the initial value of the reference amount to be at most one-half of the full-capacity of the backup battery 2 at the time of manufacture.

According to this configuration, the influence of deterioration of the backup battery 2 under the high temperature condition can be reduced and the life of the backup battery 2 can be prolonged. Thus, sufficient current capacity can be ensured in preference to suppressing the influence of deterioration, even when the capacity of cells is reduced because of long use of the backup battery 2.

It is also possible to store the default time-divided temperature table (that is, time-divided temperature information) for each of predetermined geographical areas and stored in the memory unit 36. The battery location temperature may be acquired in the similar processing as step S2 by using the time-divided temperature table corresponding to the geographical area, in which the subject vehicle is presently located. The predetermined area may be a city or an arbitrarily defined area.

In this case, the time-divided temperature table provided for each area may be set in correspondence to a temperature condition such as an average temperature in that area. For determining the area where the subject vehicle is located, the main control unit 31 may be configured to determine it based on the present position detected by the position detection unit 33 and the map data used by a vehicular navigation device.

In case of using the default time-divided temperature table at step S2, the main control unit 31 may be configured to select one of the time-divided temperature tables, which is provided for the area where the subject vehicle is located at present.

When the area of the present position of the vehicle is changed because of moving house, the temperature condition learning processing need be modified so that temperature condition is learned from the beginning again by using the default time-divided temperature table provided for that area. The main control unit 31 may be configured to determine a change of area of use of the subject vehicle because of moving house, for example, by checking whether the area of the present position of the subject vehicle is different from the previous area for more than a predetermined period (for example, more than several days or several weeks).

According to the above-described configuration, since the time-divided temperature table can be provided for each area where the subject vehicle is located, the life of the backup battery 2 can be more prolonged while ensuring the current capacity of the backup battery 2, which is desired in correspondence to temperature conditions.

According to above-described embodiment, the main control unit 31, the power source control unit 37 and the temperature monitor unit 40, which operate as a vehicular electric charge control apparatus, are provided in the emergency notification apparatus 3. However, for example, the power source control unit 37 and the temperature monitor unit 40 may be provided separately from the emergency notification apparatus 3.

The present invention is not limited to the above-described embodiment and modifications, but may be implemented in other embodiments.

What is claimed is:

1. An electric charge control apparatus for a vehicle having a backup battery, which is a secondary battery for supplying electric power to in-vehicle devices mounted in the vehicle in case of emergency, the electric charge control apparatus comprising:
   a residual charge amount monitor unit that monitors a residual charge amount of the backup battery;
   a time information acquisition unit that acquires present time information indicating a present time;
   a time-divided temperature information storage unit that stores time-divided temperature information, which indicates a temperature in each predetermined period at a battery location of the backup battery;
   a charge/discharge amount determination unit that determines a charge/discharge amount of the backup battery based on the time-divided temperature information and the residual charge amount, the time-divided temperature information being acquired based on the present time information and the time-divided temperature information;
   a residual charge amount control unit that controls the residual charge amount of the backup battery by charging and discharging the backup battery in accordance with the charge/discharge amount determined by the charge/discharge amount determination unit;
   a position detection unit that detects a present position of the vehicle,
   wherein the time-divided temperature information storage unit stores the time-divided temperature information for each geographical area, and
   wherein the charge/discharge amount determination unit selects the time-divided temperature information of an area, which corresponds to the present position of the vehicle, acquires the time-divided temperature information, which corresponds to the predetermined period of the present time and the area of the present position of the vehicle, based on the selected time-divided temperature information and the acquired present time information, and determines the charge/discharge amount of the backup battery based on the time-divided temperature information and the monitored residual charge amount.

2. The electric charge control apparatus according to claim 1, wherein:
   the charge/discharge amount determination unit determines the charge/discharge amount, by using a predetermined charge/discharge amount of the backup battery as a reference amount, so that the residual charge amount of the backup battery increases toward a full-charge amount as the temperature indicated by the time-divided temperature information falls.

3. The electric charge control apparatus according to claim 2, further comprising:
   a year elapse determination unit that determines years of elapse after manufacture of the backup battery,
   wherein the charge/discharge amount determination unit sets the reference amount to increase toward the full charge capacity amount as the years of elapse increase, by using at most one-half of the full charge capacity at time of manufacture as the reference amount.

4. The electric charge control apparatus according to claim 2, further comprising:
   a temperature monitor unit that monitors a temperature at the battery location of the backup battery; and
   an integrated environmental temperature determination unit that determines an integrated value of the temperature of the battery location of the backup battery monitored after manufacture of the backup battery,
   wherein the charge/discharge amount determination unit sets the reference amount to increase toward the full charge capacity amount as the integrated value of the temperature increases, by using at most one-half of the full charge capacity amount of the backup battery at time of manufacture as the reference amount.

5. The electric charge control apparatus according to claim 1, wherein:
   the predetermined period is set to either one of one month or one season in one year.

6. The electric charge control apparatus according to claim 5, further comprising:
a temperature monitor unit that monitors a temperature of the battery location of the backup battery; and
a temperature condition learning unit that learns a temperature condition of the battery location of the backup battery for the predetermined period based on the temperature repetitively monitored by the temperature monitor unit,
wherein the time-divided temperature information is stored in the time-divided temperature information storage unit based on a learning result of the temperature condition learning unit.

7. The electric charge control apparatus according to claim 6, wherein:
the temperature condition learning unit learns temperature condition of the battery location of the backup battery for the each predetermined period based on the temperature repetitively monitored at the battery location of the backup battery for at least two years.

8. The electric charge control apparatus according to claim 1, wherein:
the time-divided temperature information indicates an average temperature in the each predetermined period at the battery location of the backup battery.

9. An emergency notification system comprising:
an emergency notification apparatus that is mounted in the vehicle as an in-vehicle device and performs an emergency notification when event information indicating an occurrence of emergency is inputted;
a management station that receives the emergency notification from the emergency notification apparatus through communication with the emergency notification apparatus;
a backup battery, which is a secondary battery for supplying electric power to the emergency notification apparatus in case of emergency; and
the electric charge control apparatus according to claim 1.

10. The emergency notification system according to claim 9, wherein:
the electric charge control apparatus has a temperature monitor unit that monitors a temperature at the battery location of the backup battery; and
the emergency notification apparatus has a notification unit that notifies that a continuation period of emergency notification from the emergency notification apparatus is shortened, when the temperature monitored by the temperature monitor unit is less than a predetermined temperature.

11. The emergency notification system according to claim 9, wherein:
the emergency notification apparatus has an emergency notification continuation period calculation unit that calculates a continuation period of the emergency notification based on the residual charge amount of the backup battery monitored by the residual charge amount monitor unit; and
the continuation period of the emergency notification is notified to the management station.

12. The emergency notification system according to claim 11, wherein:
the emergency notification apparatus and the management station communicate each other through a base station;
the emergency notification continuation period calculation unit estimates a power consumption based on a distance to the base station and a transmission power required to transmit the emergency notification, the distance being estimated based on a delay time of radio wave propagation from the emergency notification apparatus to the base station;
the emergency notification continuation period calculation unit calculates the continuation period of the emergency notification based on the estimated power consumption and the residual charge amount of the backup battery monitored by the residual charge monitor unit; and
the continuation period of the emergency notification repetitively calculated is repetitively notified to the management station.

13. The emergency notification system according to claim 9, wherein:
the backup battery is formed of any one of a lithium-ion secondary battery, a lithium-ion polymer secondary battery and a nickel-hydride secondary battery.

14. An electric charge control apparatus for a vehicle having a backup battery, which is a secondary battery for supplying electric power to in-vehicle devices mounted in the vehicle in case of emergency, the electric charge control apparatus comprising:
a residual charge amount monitor unit that monitors a residual charge amount of the backup battery;
a time information acquisition unit that acquires present time information indicating a present time;
a time-divided temperature information storage unit that stores time-divided temperature information, which indicates a temperature in each predetermined period at a battery location of the backup battery;
a charge/discharge amount determination unit that determines a charge/discharge amount of the backup battery based on the time-divided temperature information and the residual charge amount, the time-divided temperature information being acquired based on the present time information and the time-divided temperature information; and
a residual charge amount control unit that controls the residual charge amount of the backup battery by charging and discharging the backup battery in accordance with the charge/discharge amount determined by the charge/discharge amount determination unit; wherein
the charge/discharge amount determination unit determines the charge/discharge amount, by using a predetermined charge/discharge amount of the backup battery as a reference amount, so that the residual charge amount of the backup battery increases toward a full-charge amount as the temperature indicated by the time-divided temperature information falls, the electric charge control apparatus further comprising:
a year elapse determination unit that determines years of elapse after manufacture of the backup battery,
wherein the charge/discharge amount determination unit sets the reference amount to increase toward the full charge capacity amount as the years of elapse increase, by using at most one-half of the full charge capacity at time of manufacture as the reference amount.

15. An electric charge control apparatus for a vehicle having a backup battery, which is a secondary battery for supplying electric power to in-vehicle devices mounted in the vehicle in case of emergency, the electric charge control apparatus comprising:
a residual charge amount monitor unit that monitors a residual charge amount of the backup battery;
a time information acquisition unit that acquires present time information indicating a present time;
a time-divided temperature information storage unit that stores time-divided temperature information, which indicates a temperature in each predetermined period at a battery location of the backup battery;

a charge/discharge amount determination unit that determines a charge/discharge amount of the backup battery based on the time-divided temperature information and the residual charge amount, the time-divided temperature information being acquired based on the present time information and the time-divided temperature information; and a residual charge amount control unit that controls the residual charge amount of the backup battery by charging and discharging the backup battery in accordance with the charge/discharge amount determined by the charge/discharge amount determination unit; wherein the charge/discharge amount determination unit determines the charge/discharge amount, by using a predetermined charge/discharge amount of the backup battery as a reference amount, so that the residual charge amount of the backup battery increases toward a full-charge amount as the temperature indicated by the time-divided temperature information falls, the electric charge control apparatus further comprising:

a temperature monitor unit that monitors a temperature at the battery location of the backup battery; and an integrated environmental temperature determination unit that determines an integrated value of the temperature of the battery location of the backup battery monitored after manufacture of the backup battery, wherein the charge/discharge amount determination unit sets the reference amount to increase toward the full charge capacity amount as the integrated value of the temperature increases, by using at most one-half of the full charge capacity amount of the backup battery at time of manufacture as the reference amount.

16. An emergency notification system comprising:

an emergency notification apparatus that is mounted in the vehicle as an in-vehicle device and performs an emergency notification when event information indicating an occurrence of emergency is inputted;

a management station that receives the emergency notification from the emergency notification apparatus through communication with the emergency notification apparatus;

a backup battery, which is a secondary battery for supplying electric power to the emergency notification apparatus in case of emergency; and an electric charge control apparatus for a vehicle having a backup battery, which is a secondary battery for supplying electric power to in-vehicle devices mounted in the vehicle in case of emergency, the electric charge control apparatus comprising:

a residual charge amount monitor unit that monitors a residual charge amount of the backup battery;

a time information acquisition unit that acquires present time information indicating a present time;

a time-divided temperature information storage unit that stores time-divided temperature information, which indicates a temperature in each predetermined period at a battery location of the backup battery;

a charge/discharge amount determination unit that determines a charge/discharge amount of the backup battery based on the time-divided temperature information and the residual charge amount, the time-divided temperature information being acquired based on the present time information and the time-divided temperature information; and a residual charge amount control unit that controls the residual charge amount of the backup battery by charging and discharging the backup battery in accordance with the charge/discharge amount determined by the charge/discharge amount determination unit; wherein the electric charge control apparatus has a temperature monitor unit that monitors a temperature at the battery location of the backup battery; and the emergency notification apparatus has a notification unit that notifies that a continuation period of emergency notification from the emergency notification apparatus is shortened, when the temperature monitored by the temperature monitor unit is less than a predetermined temperature.

17. An emergency notification system comprising:

an emergency notification apparatus that is mounted in the vehicle as an in-vehicle device and performs an emergency notification when event information indicating an occurrence of emergency is inputted;

a management station that receives the emergency notification from the emergency notification apparatus through communication with the emergency notification apparatus;

a backup battery, which is a secondary battery for supplying electric power to the emergency notification apparatus in case of emergency; and an electric charge control apparatus for a vehicle having a backup battery, which is a secondary battery for supplying electric power to in-vehicle devices mounted in the vehicle in case of emergency, the electric charge control apparatus comprising:

a residual charge amount monitor unit that monitors a residual charge amount of the backup battery;

a time information acquisition unit that acquires present time information indicating a present time;

a time-divided temperature information storage unit that stores time-divided temperature information, which indicates a temperature in each predetermined period at a battery location of the backup battery;

a charge/discharge amount determination unit that determines a charge/discharge amount of the backup battery based on the time-divided temperature information and the residual charge amount, the time-divided temperature information being acquired based on the present time information and the time-divided temperature information; and a residual charge amount control unit that controls the residual charge amount of the backup battery by charging and discharging the backup battery in accordance with the charge/discharge amount determined by the charge/discharge amount determination unit; wherein the emergency notification apparatus has an emergency notification continuation period calculation unit that calculates a continuation period of the emergency notification based on the residual charge amount of the backup battery monitored by the residual charge amount monitor unit;

the continuation period of the emergency notification is notified to the management station;

the emergency notification apparatus and the management station communicate each other through a base station;

the emergency notification continuation period calculation unit estimates a power consumption based on a distance to the base station and a transmission power required to transmit the emergency notification, the distance being estimated based on a delay time of radio wave propagation from the emergency notification apparatus to the base station;

the emergency notification continuation period calculation unit calculates the continuation period of the emergency notification based on the estimated power consumption and the residual charge amount of the backup battery monitored by the residual charge monitor unit; and the continuation period of the emergency notification repetitively calculated is repetitively notified to the management station.

* * * * *